US006913182B2

(12) United States Patent
Stoops

(10) Patent No.: US 6,913,182 B2
(45) Date of Patent: Jul. 5, 2005

(54) METHOD AND APPARATUS FOR CONTROLLED APPLICATION OF FLUX

(75) Inventor: Bradley N. Stoops, Bay Village, OH (US)

(73) Assignee: Precision Dispensing Equipment, Inc., Bay Village, OH (US)

( * ) Notice: Subject to any disclaimer, the term of this patent is extended or adjusted under 35 U.S.C. 154(b) by 93 days.

(21) Appl. No.: 10/342,861

(22) Filed: Jan. 15, 2003

(65) Prior Publication Data

US 2003/0136817 A1 Jul. 24, 2003

Related U.S. Application Data

(60) Provisional application No. 60/349,594, filed on Jan. 18, 2002.

(51) Int. Cl.[7] .......................... B23K 1/00; B23K 20/08; B23K 5/00; B23K 1/20
(52) U.S. Cl. .......................................... 228/33; 228/13
(58) Field of Search ................ 228/207, 223, 228/33, 13, 41; 118/300, 301, 302, 303, 50, 63, 313; 239/75, 79, 93, 94, 128, 135, 398, 407, 413, 569; 261/19, 38, 42, 78.1, 115, 116, 141

(56) References Cited

U.S. PATENT DOCUMENTS

| | | | | |
|---|---|---|---|---|
| 3,741,150 A | * | 6/1973 | Napor et al. ................. | 118/681 |
| 5,320,250 A | | 6/1994 | La et al. | |
| 5,328,085 A | | 7/1994 | Stoops et al. | |
| 5,368,219 A | | 11/1994 | Hogan et al. | |
| 5,560,537 A | * | 10/1996 | Sadler et al. ................ | 228/102 |
| 5,615,828 A | | 4/1997 | Stoops | |
| 5,622,752 A | | 4/1997 | Erickson et al. | |
| 5,747,102 A | * | 5/1998 | Smith et al. ................... | 427/96 |
| 5,913,455 A | | 6/1999 | La et al. | |
| 6,186,388 B1 | * | 2/2001 | Sadler et al. ................. | 228/37 |
| 6,270,019 B1 | | 8/2001 | Reighard | |
| 6,350,110 B1 | * | 2/2002 | Martin ....................... | 417/395 |
| 2001/0053420 A1 | | 12/2001 | Donges et al. | |

FOREIGN PATENT DOCUMENTS

JP 08046339 A * 2/1996 ............ H05K/3/34

OTHER PUBLICATIONS

Precision Solder, Inc., "ServoFlux System, JetFlux Plus Technology, Servo Actuator Transport Spray Flux System," 2002.

Precision Solder, Inc., "ServoFlux System, JetFlux Plus Patented Technology, Dual Servo Actuator Selective Spray Flux System," 2002.

* cited by examiner

Primary Examiner—Colleen P. Cooke
(74) Attorney, Agent, or Firm—Fay, Sharpe, Fagan, Minnich & McKee, LLP

(57) ABSTRACT

Apparatus and methods for applying atomized pulsed streams of flux to a surface such as a printed circuit board. The flux is applied discretely in selected locations and at selected thickness based upon pulse rate, fluid pressure, air pressure and traverse speed. The apparatus consists of a precise orifice with a surrounding air passage for atomizing and focusing the flux at a discrete location on the surface. Controls are incorporated for selecting, controlling and monitoring the flux deposition amount and location, for coordinating with the transport motion system, for integrating with the adjacent air flow and for selecting the atomized or non-atomized method of application.

10 Claims, 12 Drawing Sheets

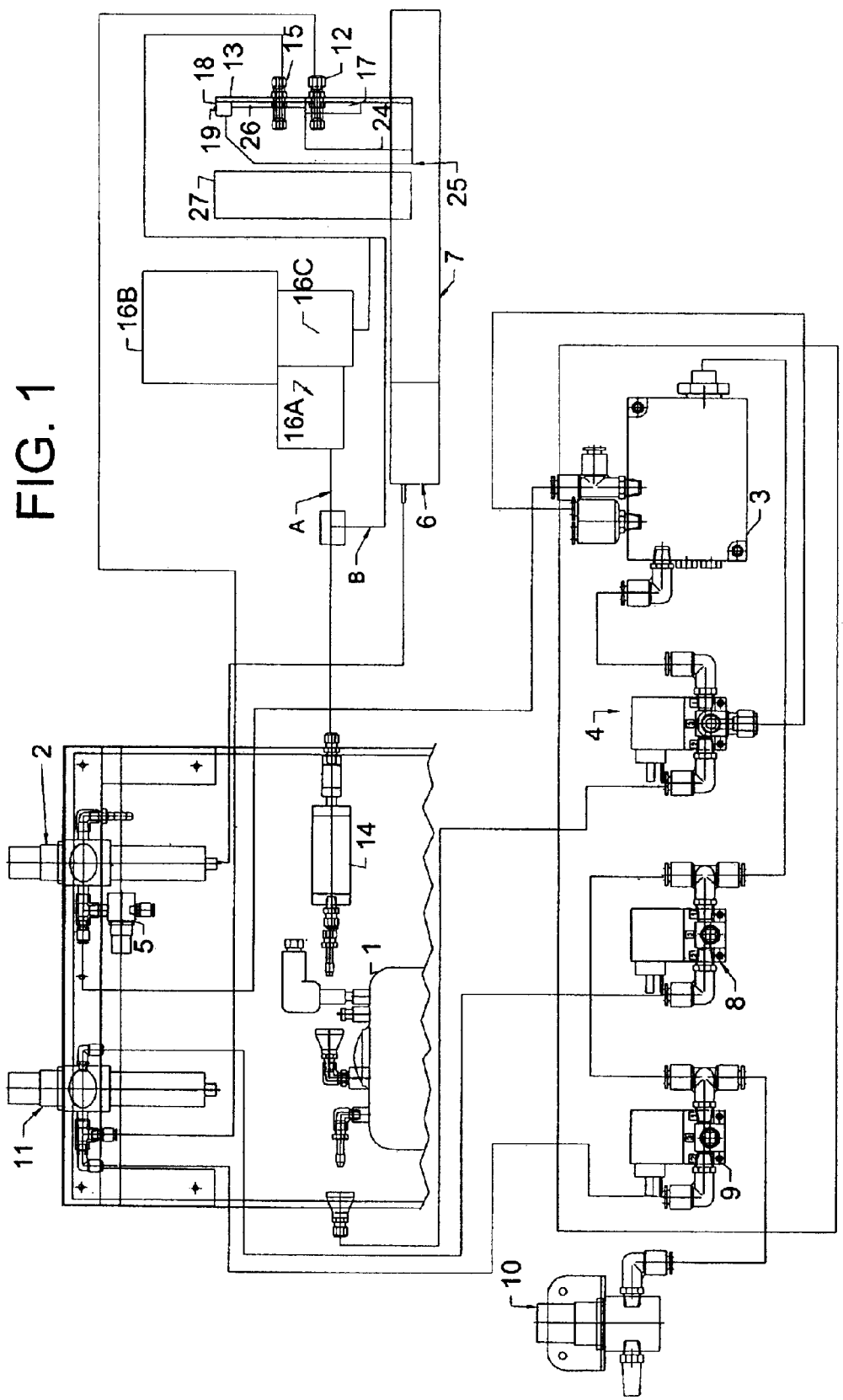

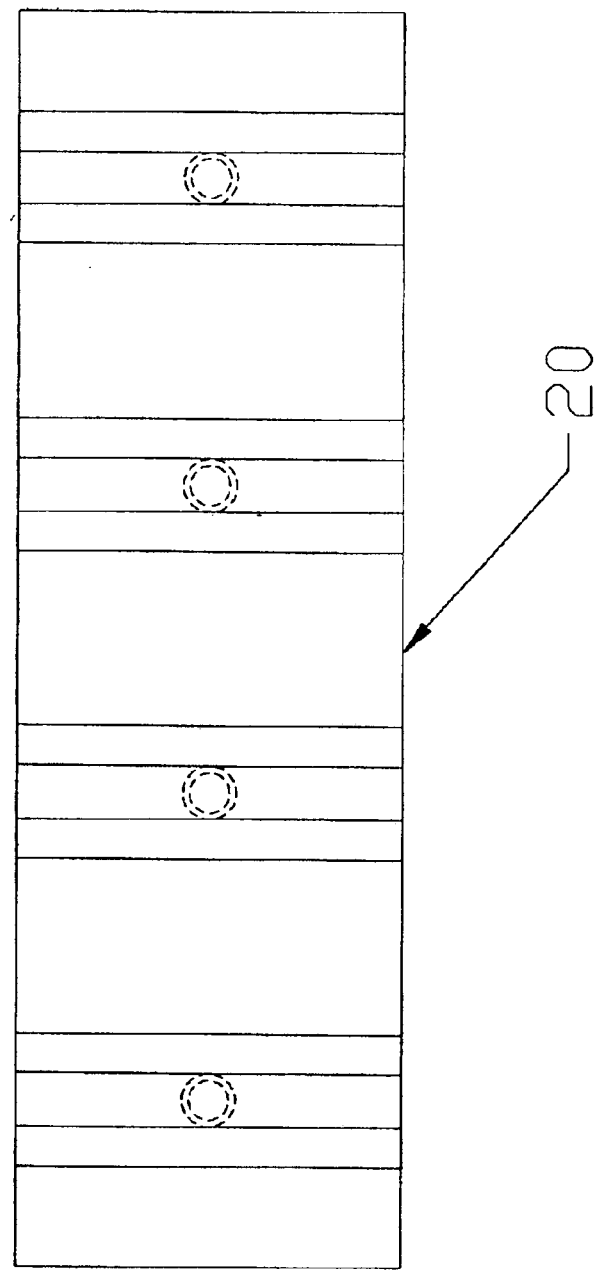

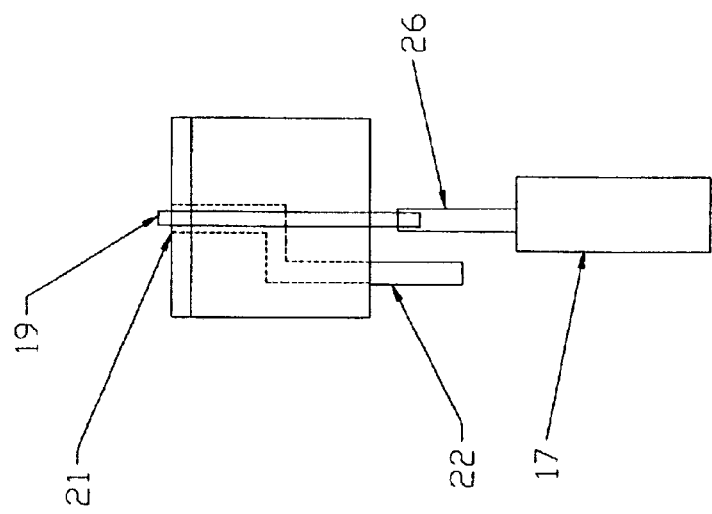

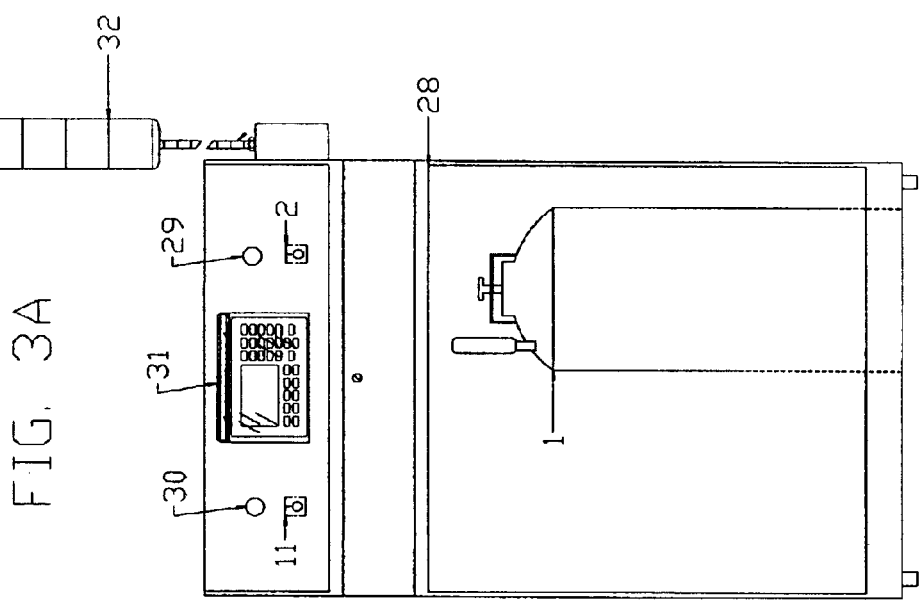

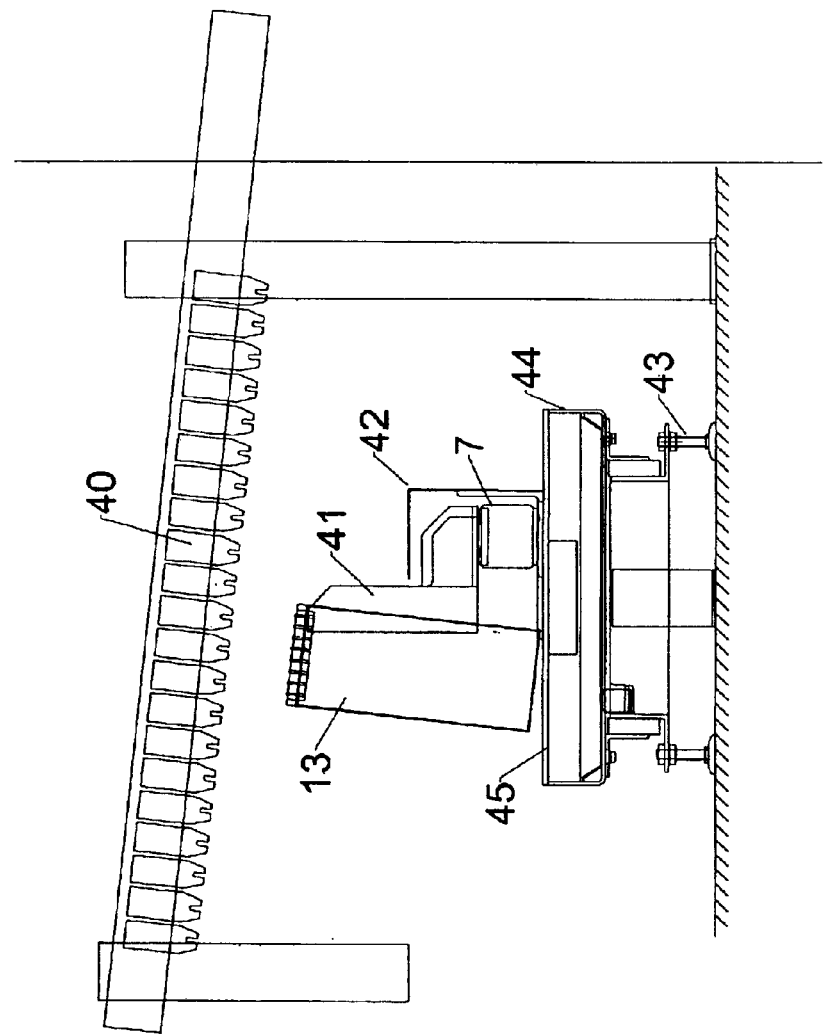

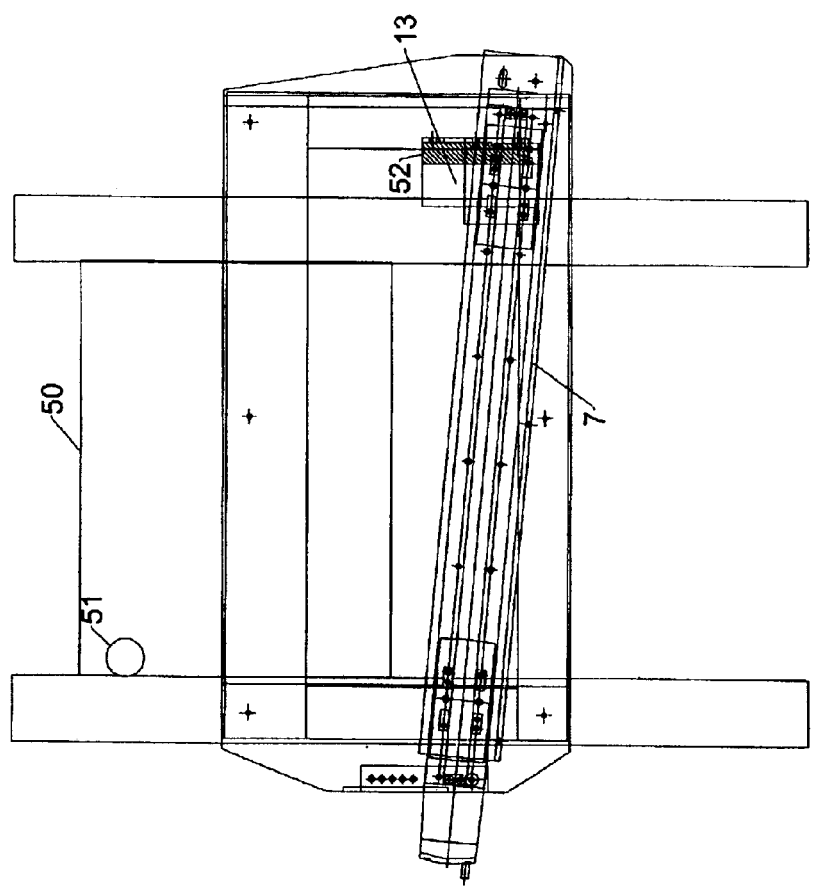

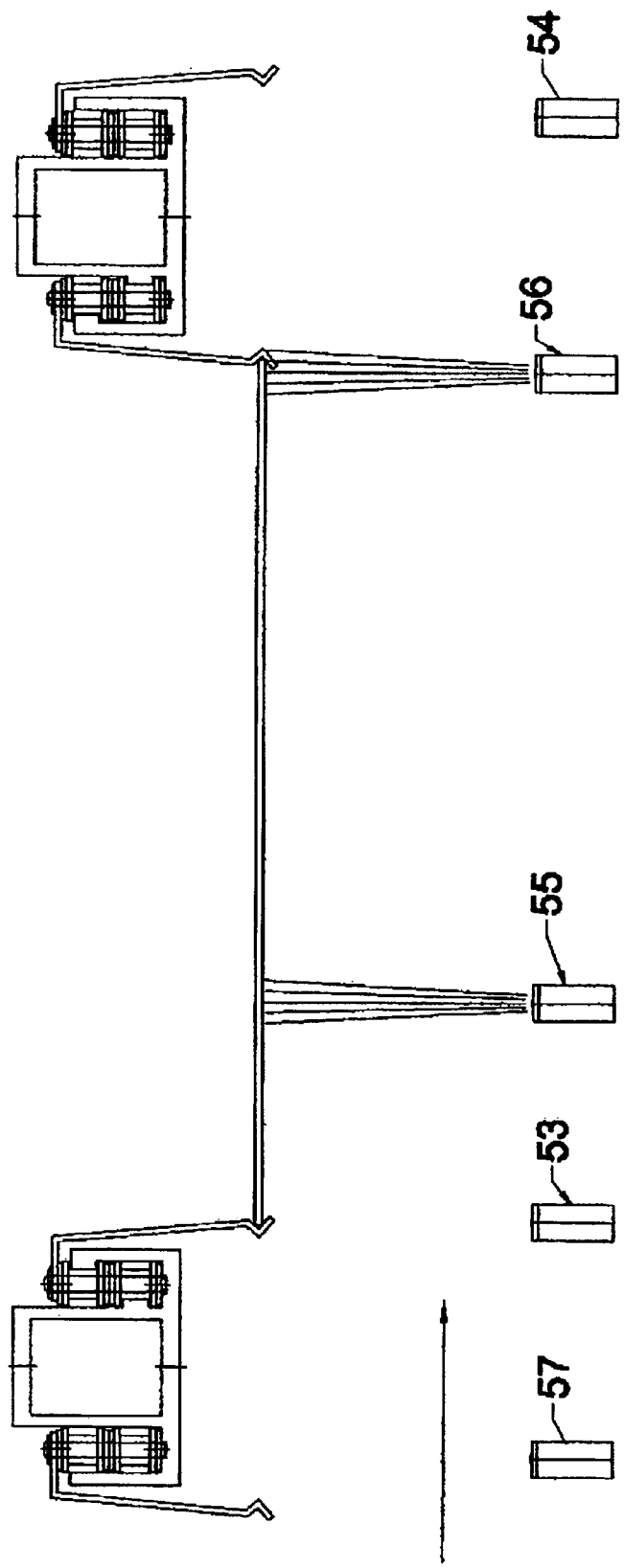

SOFTWARE FOR SELECTIVE FLUXING

60

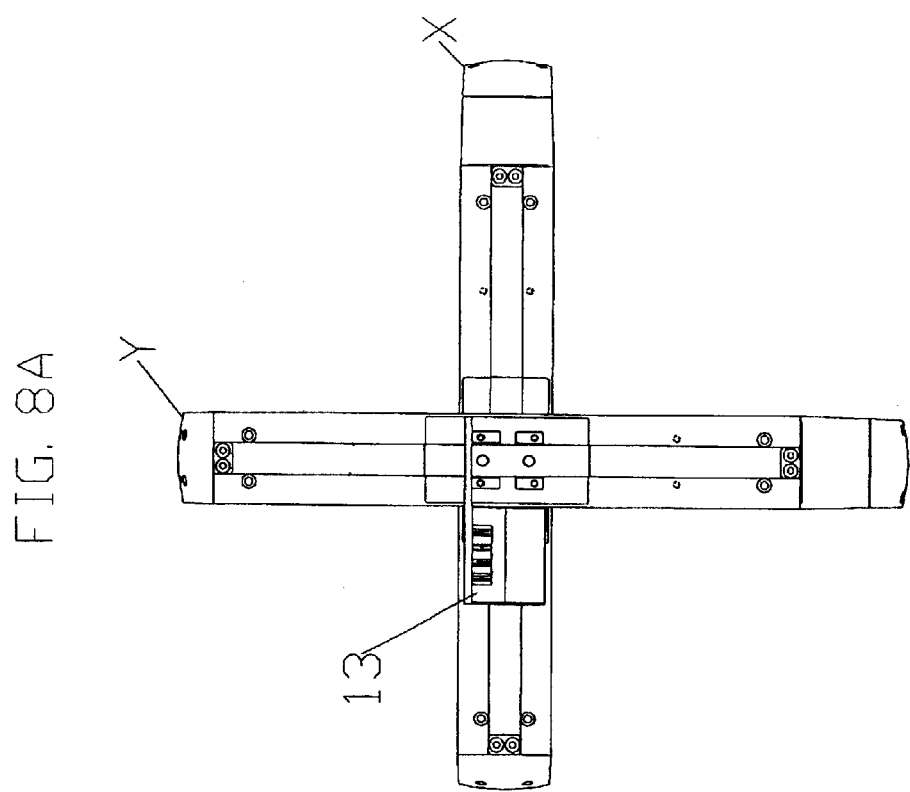

METHOD AND APPARATUS FOR CONTROLLED APPLICATION OF FLUX

This application hereby incorporates by reference and claims the benefit of the filing date of U.S. provisional applications Ser. No. 60/349,594, filed Jan. 18, 2002.

BACKGROUND OF THE INVENTION

The present invention generally relates to the controlled application of flux. The present invention is particularly related to the application of flux for the selectability of the type of deposition, either spray or droplet(s), the location of the deposition and the selected amount of deposition. Even more particularly, the present invention is related to the dispensing apparatus which can selectively provide either microdeposits or finely controlled atomization in a single device while being able to vary deposition properties rapidly during the application process. In addition, delivery of the flux to the dispensing apparatus is precisely coordinated with the dispense parameters.

This invention pertains to a method and apparatus for controlling the dispensing of fluid materials, and more particularly to a method and apparatus for controlling the dispensing of flux on an electronic assembly such as a printed circuit board, or on components used thereon.

The invention is particularly applicable to dispensing flux with a solids content less than 15% and a viscosity of less than 100 cps, and more specifically, a viscosity less than 50 cps. However, it will be appreciated that the invention has broader application and may be advantageously employed with other types of fluxes. In the assembly of a printed circuit board (PCB) the soldering process is one of the most critical steps. Soldering has traditionally been done with a process known as wave soldering. Known structures and methods for applying flux to a printed circuit board prior to the wave soldering step include liquid wave, foaming, brushing or spraying as described, for example in U.S. Pat. No. 5,328,085.

The disadvantages of each of these processes are also described in U.S. Pat. No. 5,328,085. While the prior art has reduced many of the problems of applying flux there are new requirements for more selective flux application, greater control of deposition and increased through-hole penetration of the flux. In addition, there is now a desire to flux only selected areas with a thin application of flux. These needs exist in traditional wave soldering equipment and in newer selective soldering applications.

Due to the decreased need for through-hole components, many wave soldering manufacturers are now using pallets with cut-out regions for soldering which are referred to as aperture wave solder pallets. The solder wave still contacts the complete bottom surface of the pallet but only comes in direct contact with the PCB through the open areas in the pallet. The need is for flux application that can either 1) apply flux only to the exposed areas of the board or to 2) apply flux at required quantities in the exposed areas and at a reduced amount over the rest of the bottom surface of the pallet. A small layer of flux on the pallet can extend the life of the pallet so a reduced level of flux on the pallet is desired.

In addition, there is a need for better penetration of flux into the holes in the boards while not applying excess flux or leaving a residual amount of flux at the interface of the pallets and PCB.

Also, a new approach to soldering PCBs called selective soldering requires discrete programmable amounts of flux to be applied to the PCB. Selective soldering only solders the through-hole areas and therefore only those selected areas need to have flux applied to them. This approach reduces the amount of flux used and, more importantly, can restrict the heat exposure associated with solder temperatures to only those areas on the board that require wave soldering. Current methods include stationary spray guns positioned under a template which blocks the flux where it is not needed or a programmed spray gun which moves to locations but again applies flux through the open area of a template. Both of these methods require 1) extensive maintenance due to the excess flux produced, 2) extensive tooling for each board, 3) additional setup time for changing tooling for each new board lot, and 4) inconsistencies in setting up the multiple spray guns for each discrete location.

SUMMARY OF THE INVENTION

The present invention provides an apparatus and methods for dispensing small amounts of flux in programmable amounts and discrete locations to obviate the problems and limitations of prior art apparatus and methods.

The present invention provides an apparatus and method for offering flexible application of the flux in either an atomized or non-atomized form from the same device.

Controls are provided for coordinating the atomizing air coming in contact with the dispensed small stream of flux and penetrating the component holes in the printed circuit board.

In accordance with the invention, there is provided a method for dispensing small atomized amounts of flux. The method comprises the following steps. Pressurized flux is transported from a reservoir and either to a 2-way valve, a precision pump and then to a high-speed valve assembly or directly to a high-speed valve assembly. When the valve pulses, a small stream of flux flows through a precise orifice. The atomizing air is released at a coordinated time to atomize and propel the flux toward the printed circuit board. Alternatively, the atomizing air is not released and a small droplet of flux is propelled toward the circuit board.

Also in accordance with this invention, there is disclosed the method for applying more or less flux with each pulsation.

Further in accordance with the invention, a method is provided for dispensing a small atomized or non-atomized amount of flux being alternatively selected to match the required deposition.

Further in accordance with the invention, a dispensing apparatus includes individual or multiple precision orifices with concentric air channels connected to individual or multiple high-speed actuation valves.

These dispensing technologies are coordinated while a motion mechanism of one or more axes of motion transports the apparatus with respect to the printed circuit board or electronic assembly.

Still another embodiment of the present invention relates to the movement of the dispensing device with respect to the printed circuit board such that the flux is perpendicular.

Also, in accordance with the invention, there is disclosed the use of a fan of air to follow the application of flux to spread the flux as it is applied for more equal deposition, thinner deposition and better hole penetration.

By controlling the dispensing parameters, a PCB is selectively soldered without the use of aperture pallets.

The present invention uses a precision pump to coordinate the precise amount of flux delivered to the dispensing valve for either atomized or non-atomized flux application.

Still other features and benefits of the invention will become apparent upon reading and understanding the following detailed description.

BRIEF DESCRIPTION OF DRAWINGS

FIG. 1 is a schematic of the fluidics and pneumatics of the system.

FIGS. 2A, 2B and 2C are drawings of a nozzle assembly from three views, front, top and side respectively.

FIGS. 3A and 3B are drawings of the control console and interior console panel respectively.

FIG. 4 shows a single axis assembly.

FIG. 5 illustrates a dispensing assembly in a wave solder system.

FIG. 6 is a drawing of the servo traverse parameters diagram.

FIGS. 8A and 8B are drawings of multi-axis assembly, top and elevational views respectively.

DETAILED DESCRIPTION OF THE INVENTION

Figure 2A:
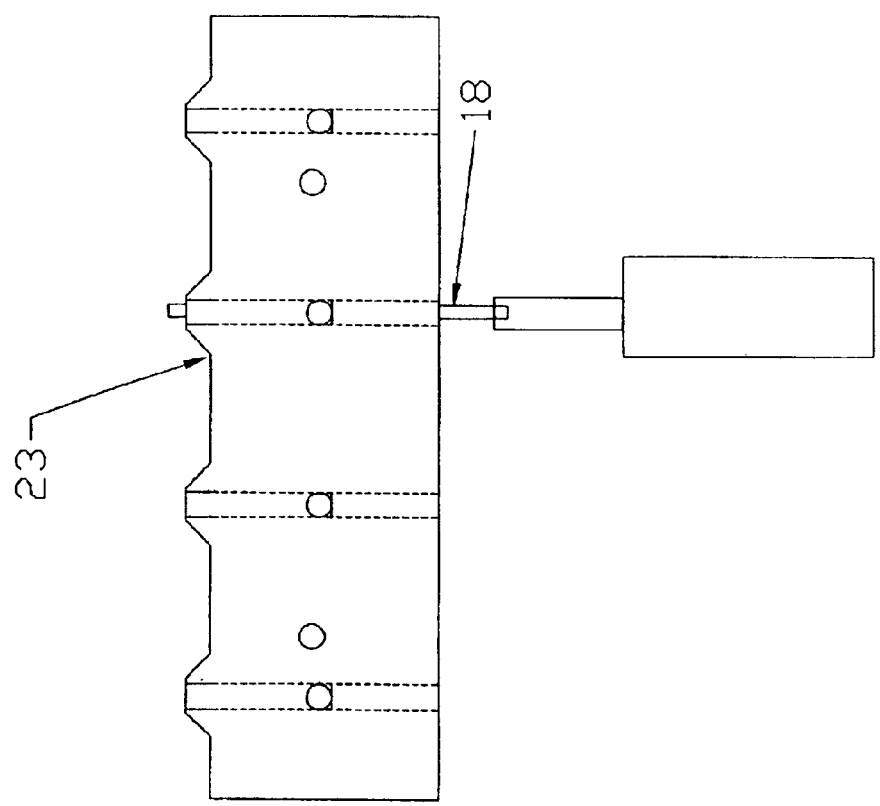

Referring first to FIG. 1, solder flux or other liquids that will benefit from this invention are poured into a flux reservoir 1. This reservoir is generally pressurized from one to thirty (1 to 30) psi with air or nitrogen (or another inert gas). The amount of reservoir pressurization is controlled by setting a main regulator 2 and input from the operator to a flux reservoir pressure control valve 3. A reservoir pressure solenoid valve 4 status determines if this pressurized air is applied to the reservoir 1.

The main regulator 2 (with a typical setting in the range of 60 to 100 psi) and servo purge needle valve 5 control the level of air directed to a servo actuator 6 to provide for exclusion of flammable fumes from the servo controls associated with a servoactuator 7.

The main regulator 2 also controls the level of air or nitrogen to flow to head air solenoid 8, head purge solenoid 9 and cabinet purge 10. A head regulator 11 controls the level of air to dispenser air input fitting 12 set in a range of five to sixty (5 to 60) psi. The head air solenoid 8 controls when this air is directed to flux dispenser 13. The air is turned on prior to the beginning of the dispense and turned off at the end of a dispense routine. It will be appreciated that this air control could also be pulsed during the operation to achieve results needed in certain uses. The head purge solenoid controls when the level of air from the main regulator is provided to the air dispenser input fitting 12. This purge of air is used intermittently to prevent contamination of the dispense orifice.

The pressurized flux from the flux reservoir 1 flows through a filter 14 of typically one-half (0.5) micron to one hundred (100) micron mesh and then either directly to input flux fitting 15 (shown as path A in FIG. 1) or to a 2-way valve 16A and then into a precision positive displacement metering pump 16B (such as manufactured by The Lee Company of Westbrook, Conn.) which then accurately controls the timing and amount of flux to 2-way valve 16C and then to the input flux fitting 15 (shown as path B in FIG. 1). A 3-way valve could be substituted for the two 2-way valves 16A and 16C. Path A provides flux, at ambient pressure or at elevated pressure, to the metering pump and then through a fitting to the high speed solenoid valve. Path B provides pressurized flux through a fitting to the high speed solenoid valve. Either path A or B can alternatively be positively connected directly to a high speed solenoid operated valve 17 (such as manufactured by The Lee Company of Westbrook, Conn.) without passing through a fitting.

The solenoid valve 17 actuates the flux in a range of two-ten thousandths to two hundredths (0.0002 to 0.020) second opening time (correlated to the spike and hold time from the driver circuit) and one-thousandths to two tenths (0.001 to 0.200) second close time (again correlated to the off time of the driver circuit). The 2-way valve 16A opens when the precision piston pump 16B retracts to fill the internal small diameter chamber and the valve 16A closes when the piston in the precision pump 16B advances to prevent flow back toward the reservoir. The refilling operation is done when a new circuit board enters the system or when the actuator retracts for the next dispensing stroke.

The combination of a high speed solenoid valve dispenser and a metering pump provides an improved range of control which provides additional production capabilities not achievable with a solenoid valve dispenser alone. The precision pump which has a resolution of less than five hundred (500) nanoliters and, more preferably less than ten (10) nanoliters, results in a stable and predictable dispensing operation. As a result, the high speed solenoid valve 17 delivers precise quantities of flux and the high speed solenoid valve should not be susceptible to clogging due to air or gas bubbles. Due to the positive metering by the pump, any air bubbles tend to be ejected out of the solenoid valve 17 by operation of the positive displacement pump 16B. Also, any contaminants are likely removed. In addition, the timing of the pump is calibrated to the system elasticities and tubing lengths to provide the preferred pressure profile. Based upon the software calculation of system elasticity, the pressure profile is therefore predictable and, most importantly, repeatable.

Further, the use of a precision pump can assure the delivery of the proper amount of flux at the proper time by eliminating issues of fluid viscosities and/or temperature considerations which affect fluid viscosities.

The pump has the additional capability of being able to selectively aspirate liquids from the nozzle. This could be important in preserving costly materials, cleaning the system and preventing orifice clogging.

It will be further appreciated that the timing of this stepper or servo controlled pump 16B with respect to the high speed valve 17 operation is critical in both the atomized and non-atomized mode of operation. Flux deposition control will allow for one to two hundred (1 to 200) nanoliter range of depositing drops of flux and atomized film depositions from three-thousandths (0.003) inch coating thickness down to one one-hundred-thoudandths (0.00001) inch thickness or less depending upon the coating composition and percentage of solids.

The flux is pulsed at the above-mentioned resolution from the high speed valve 17 to an orifice assembly 18 that includes precision orifice 19 as will be described further below with respect to FIGS. 2A, 2B and 2C. The viscosity is typically less than one hundred (100) cps. Where the viscosity is higher, a heater can be employed to reduce the viscosity to this preferred range.

Referring to FIG. 1 a valve enclosure 24 prevents exposure of the valve to the flux. The dispense assembly 13 is preferably enclosed in a stainless steel enclosure 25.

A follower air flow device 27 improves the flux penetration in the holes, spreads the flux even more consistently and reduces the thickness of the flux. The air flow from device is coordinated such that it is on when the dispensing pass is being made. It could also be activated on the return stroke if additional through hole penetration is needed.

With reference now to FIGS. 2A, 2B and 2C, an orifice assembly 18, for example, has stainless tube with a pressed in precision orifice 19 which can be made of a material such as sapphire or silica or from a micromachined process. The precision orifice 19 is generally in a range of 0.003 inches to 0.010 inches diameter. It is held in a mounting plate 20 made from a corrosion resistant and resilient material such as Delrin (trademark of E. I. DuPont Corporation of Wilmington, Del.) or Ertalyte (trademark of DSM Engineering Plastic Products Corporation of Reading, Pa.). This mounting plate could also be molded. It will also be appreciated that this mounting plate may hold from one to numerous of these orifices. In FIGS. 2A, 2B and 2C a mounting plate with four mounted orifices are shown. The flux is metered from the high speed solenoid valve 17 to the precision orifice 19 and a predetermined amount of flux enters the atomization region. As a result of the introduction of a gas through inlet tubing 22 and from the outlet passage 21, the atomization process occurs directly above the precision orifice at the intersection of the atomizing air path. At this intersection the flux is atomized into smaller droplets which produce a narrow pattern of a predetermined amount of flux onto a PCB or component thereof. It can also be appreciated that different configurations of orifices could be mounted in each of the mounting holes or be directly mounted into the mounting plate without the external stainless tube being required. The mounting block allows for easy insertion or removal of the orifice assembly 18. Small diameter tubing 26 from the high speed dispensing valve 17 to the orifice can be directly mounted to the mounting plate.

The precision orifice 19 has an air passage 21 between it and the mounting plate. This passage introduces air for atomization of the dispensed flux or can be turned off for non-atomized dispensing of the flux. This selective feature can be turned on or off as needed during flux application via operator control, i.e., program control. The air flows from the input air fitting 12 to input air tube 22 located on the mounting plate 20. The air is then transported through precision passages in the mounting plate to give equally distributed flow of air around the precision orifice 19. This provides good control of the manner in which the air is atomized with a high level of control of the atomization conditions of air flow and fluid dynamics. This air flow also results in very focused and consistent air flow to the circuit board. In turn, this results in excellent penetration of the flux into the open through-holes on the board due to the high velocity and consistent nature of this focused air flow.

There are also drain passages 23 built on the top surface of the mounting plate 20 which drain away any excess flux such that the flux does not block the air passages 21.

The tubing 26 from the valve is shown as going directly to one orifice. It will be appreciated that the tubing can be multiplexed to provide fluid to more than one precision orifice 19 at a time. It will also be appreciated that the nozzle assembly can be in other forms such that the nozzles are arranged in different configurations with different quantities of nozzles and can be made of alternative materials. In addition, it can be appreciated that a heater can be attached to the nozzle or plate to heat the flux.

Referring to FIG. 3A control console 28 is shown. It shows the previously discussed flux reservoir 1, main regulator 2 and head regulator 11 on the main operator panel. A main regulator gauge 29 and head regulator gauge 30 are also shown. An operator interface panel 31 is used to enter in all system parameters and to provide user control of the system. Alternatively, this interface can be excluded when the microprocessor system controls 33 communicate directly with the wave solder system controls. In that case the configuration and process parameters are entered directly through the wave solder system operator interface. An optional light tower 32 shows the system status.

Figure 3B:
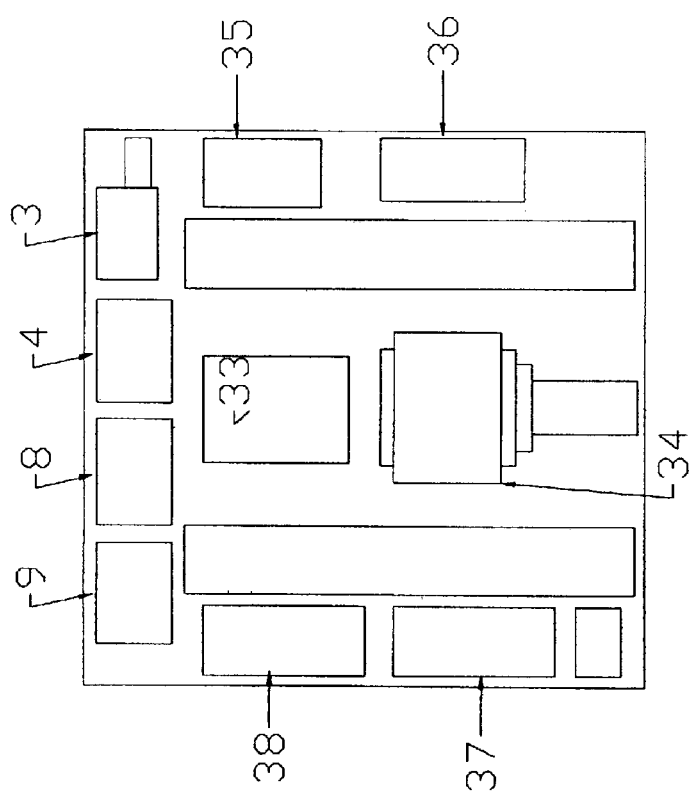

Within the control console 28 are the control devices for the system. As previously discussed the air control system devices 3, 4, 8 and 9 are shown in FIG. 3B. In addition, main microprocessor system control 33 is shown. This control coordinates the operator interface data 31 with valve controller 34, actuator servo control 35, precision pump control 36, input and output signals and the wave solder system main controller. The valve controller 34 also has two associated power supplies 37 and 38 for the spike and hold circuit. This circuit and driver give precise control to the quantity and flow rate of flux dispensed. The precision pump 16B and pump controller 36 ensure that the fluid dynamics are also well controlled and coordinated with the driver circuit in the valve control 34.

As a result of these controls, volumes of flux from one (1) nanoliter or less to approximately two hundred (200) nanoliters can be predictably and repeatedly applied in either an atomized or non-atomized mode from each dispense.

FIG. 4 shows the system as mounted within a wave solder system. Wave solder transport fingers 40 are shown above the flux dispensing system and the circuit boards are conveyed from the right to the left. The dispense assembly 13 is mounted to the servo actuator 7 through an adjustable mounting means or adjustable brackets 41. When mounted this way, the assembly is orthogonal to the angle of the bottom of the circuit board. A cover assembly 42 protects the mechanism from any residue and there is a stainless pan 45 below the assembly to capture any flux. Leveling legs 43 support main slide assembly 44. The assembly is therefore easily mounted and adjusted and takes up minimal area within the wave solder system. Its organized and simplified structure also provides ease of maintenance. If the optional air flow system 27, as described with reference to FIG. 1, is attached to this assembly, even more complete fluxing capability in certain situations is provided.

FIG. 5 illustrates the operation of the flux dispenser 13 and associated system as a circuit board 50 enters the wave solder system. The circuit board first passes over a sensor 51. The system control 33 receives this input and then calculates the position of the board based upon the conveyor speed. When the leading edge of the PCB reaches the end of the spray pattern 52 then the actuator moves the flux dispenser under the board. The servoactuator 7 is positioned at an angle so that the flux is applied parallel to the board even though the circuit board is in motion. The flux can be applied at any location with the flux being turned on and off during the motion and different segments can be engaged in either the atomized or non-atomized mode for changes in the width of the applied flux.

FIG. 6 shows the application of the flux to the board. Configuration offsets 53 and 54 are used to represent the locations at which the actuator has achieved a constant speed for the corresponding motion direction. 54 is referenced in the direction toward 56 and 53 is referenced to the direction toward 55. Constant speed is critical to consistent flux deposition. The edge start 55 and board width 56 are used to define the region wherein the flux is to be applied. These positions are all referenced to the home position 57.

Figure 7:
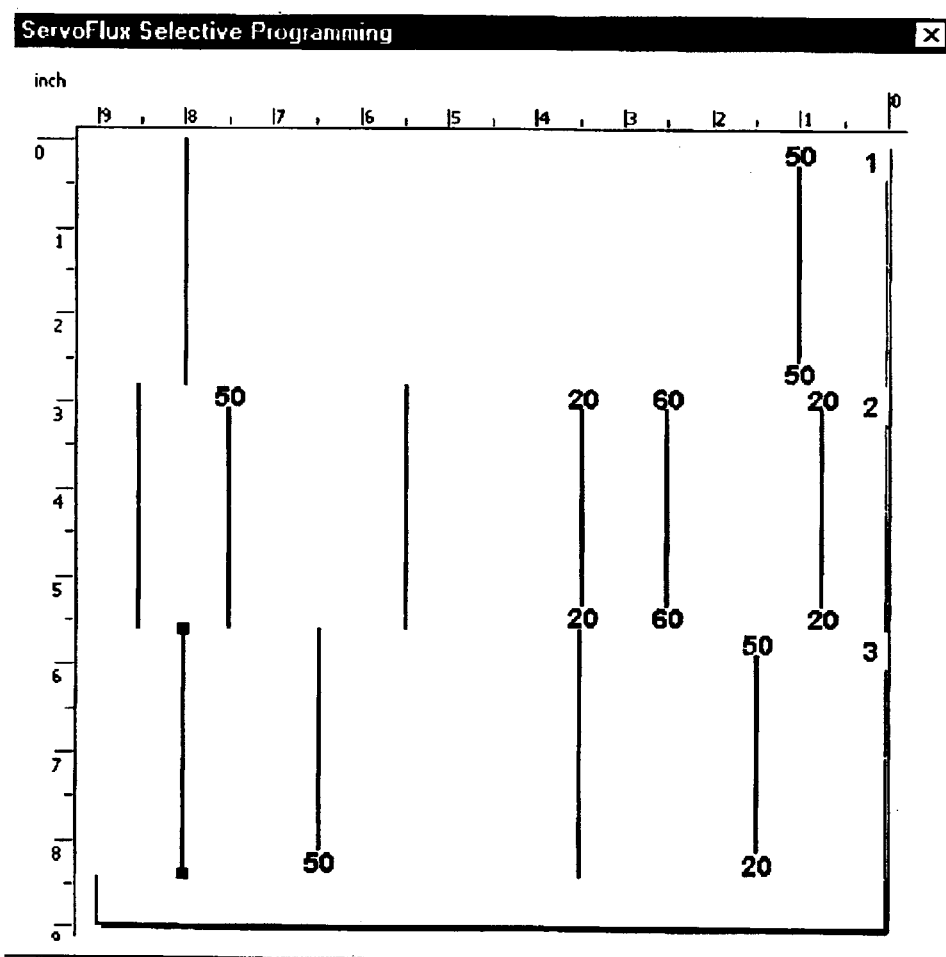
FIG. 7 is a display of operator entry of selective programming.

In FIG. 7 the benefits of the above discussed integrated controls, consistent flux deposition and precise control of flux deposition can be appreciated. FIG. 7 shows the operating interface for the selection of flux deposition at precise locations and at selectable depositions for each location. Entry screen 60 shows that the flux dispenser can be turned on and off at precise locations while the actuator 7 is in motion. FIG. 7 shows an example of 3 horizontal passes. In the first pass the flux is deposited at 1" from the right as shown by the scale at the top. The deposition is 50% of maximum flow and is deposited to the 8" scale location. The second pass shows a deposition starting at position 0.75" at 20% deposition, increasing at 2.5" to 60% deposition, reducing at 3.5" to 20% deposition and then ending at 5.5". The second pass has an additional application of 50% deposition at 7.5" and ends at 8.5". It can be seen that the programming allows for variable deposition at any location. The flux can be applied by varying the pulse rate, pressure, precision pump and actuator speed which are all under digital control. In addition, the air control allows for flux dispensing in either an atomized or non-atomized mode. Since the flux can be applied while the system is in motion the production rate can be much higher and the deposition is consistent. The amount of flux applied can be a variable for each location while the system is in motion or if it is stationary under a selected location. Depositions of less than two millimeter (2 mm) diameter can be achieved in the non-atomized mode and depositions of less than seven millimeters (7 mm) diameter can be achieved in the atomized mode. Of course, these dimensions are only representative ranges and should not be deemed limiting.

The deposition of flux from such a dispensing system is predictable and can be calculated based upon the system operating parameters.

The flux system can be placed in an external system prior to the wave solder system. This conveyor would then transport the circuit board to the wave solder system. An external exhaust hood is also supplied with this stand-alone system.

Figure 8B:
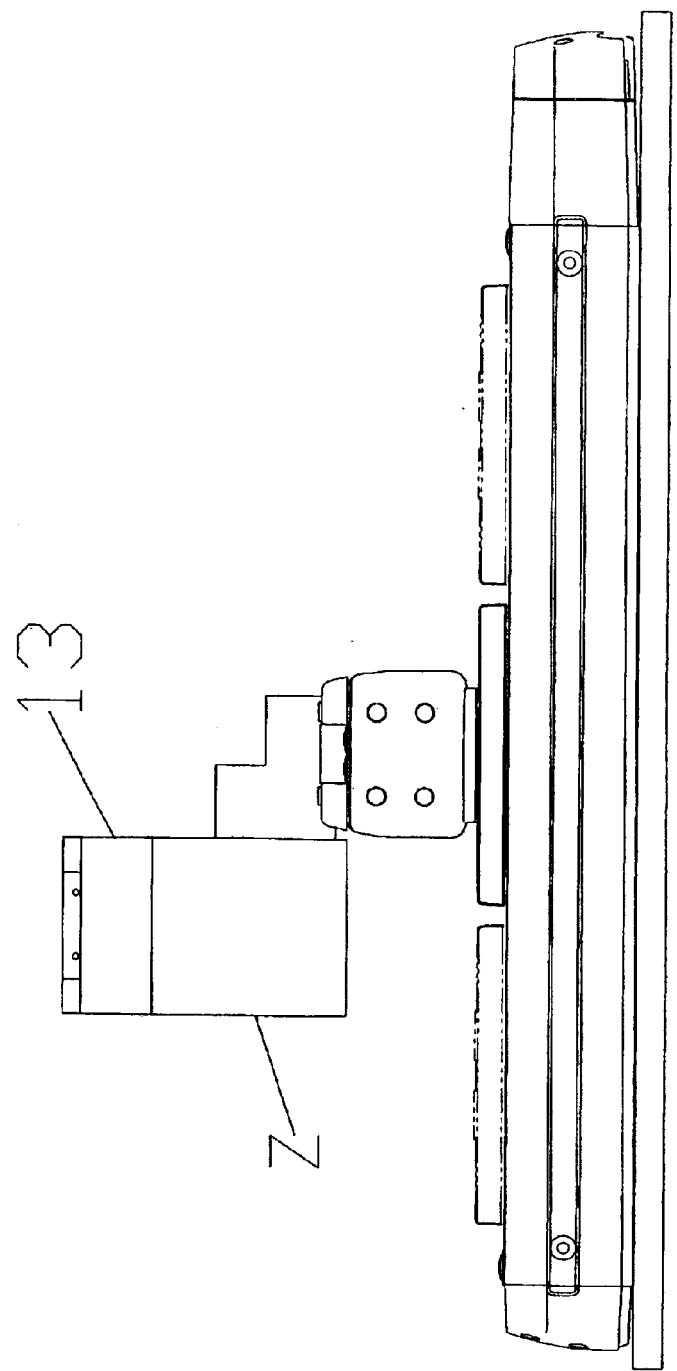

Referring to FIG. 8A, the flux dispenser 13 can also be mounted on a two-axis system (X and Y) for movement to precise locations under a stationary board. A third axis (Z) can also be added to adjust for any height requirements as shown in FIG. 8B.

It can be further appreciated that the above system could be equally well suited for the application of flux to the top of a substrate such as a printed circuit board with different parameters to be considered but within the range of such an apparatus and process capability.

Likewise, it can be appreciated that the structure described above could be applied to other materials such as conformal coatings, solder resists, and such with other considerations in these environments.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An apparatus adapted to dispense flux from an associated flux source, the apparatus comprising:
   means for forming a droplet of flux including a metering pump in communication with the associated flux source for selectively delivering a metered amount of pressurized flux; and
   a dispenser in selective communication with the metering pump, the dispenser including a discharge conduit and a gas delivery conduit, wherein the discharge conduit includes an orifice for dispensing flux onto an associated surface, and wherein the gas delivery conduit and the discharge conduit intersect whereby droplets of flux are atomized when dispensed from the orifice.

2. The apparatus of claim 1, wherein said means for forming a droplet comprises a high speed valve which delivers flux at discrete locations and volumes.

3. The apparatus of claim 2, wherein the valve comprises a solenoid valve that actuates in a range of about 0.0002 to about 0.020 second opening time.

4. The apparatus of claim 1, further comprising a flux of less than 50 cps at the point of atomization.

5. The apparatus of claim 1, wherein a heater is used to reduce the viscosity of the flux.

6. The apparatus of claim 1, further comprising a valve interposed between the metering pump and the flux source, wherein the valve directs flow of the associated flux towards the metering pump in a first position and the valve directs flow towards the dispenser in a second position.

7. The apparatus of claim 1, further comprising a valve upstream from the discharge conduit coordinated with the motion of the metering pump.

8. The apparatus of claim 1, further comprising a gas valve interposed between the gas delivery conduit and the pressurized gas source to selectively control introduction of pressurized gas into the gas conduit.

9. The apparatus of claim 1, wherein the orifice has a diameter of about 0.003 inches to about 0.010 inches.

10. The apparatus of claim 1, wherein said dispenser comprises a structure that can provide a deposition of associated flux having a diameter less than two millimeters in a non-atomized mode and less than seven millimeters in an atomized mode.

* * * * *